(12) United States Patent
Dazet et al.

(10) Patent No.: US 8,668,181 B2
(45) Date of Patent: Mar. 11, 2014

(54) DEVICE FOR ATTACHING A PIECE OF FURNITURE TO THE FLOOR OF AN AIRCRAFT (75) Inventors: Francis Dazet, Tournous-Darre (FR); Francois Rouyre, Cornebarrieu (FR); Alain Depeige, Tournefeuille (FR)

(73) Assignee: Airbus Operations S.A.S., Toulouse (FR)

( * ) Notice: Subject to any disclaimer, the term of this patent is extended or adjusted under 35 U.S.C. 154(b) by 300 days.

(21) Appl. No.: 12/811,387

(22) PCT Filed: Dec. 24, 2008

(86) PCT No.: PCT/FR2008/001821
§ 371 (c)(1),
(2), (4) Date: Aug. 13, 2010

(87) PCT Pub. No.: WO2009/106746
PCT Pub. Date: Sep. 3, 2009

(65) Prior Publication Data
US 2010/0314495 A1  Dec. 16, 2010

(30) Foreign Application Priority Data

Jan. 4, 2008 (FR) .................................. 08 00048

(51) Int. Cl.
*A47B 97/00* (2006.01)
*F16M 13/00* (2006.01)
*B64C 1/20* (2006.01)
*B64C 1/22* (2006.01)
*B64D 47/00* (2006.01)
*B64D 11/00* (2006.01)
*B64D 13/00* (2006.01)
*B64D 11/06* (2006.01)
*B61D 45/00* (2006.01)
*B65D 63/00* (2006.01)

(52) U.S. Cl.
USPC ........ 248/503.1; 248/500; 248/501; 248/510; 248/592; 244/118.1; 244/118.5; 244/118.6; 410/104; 410/105

(58) Field of Classification Search
USPC ............ 248/500, 424–430, 503.1; 244/118.1, 244/118.2, 118.5, 118.6, 131; 410/104, 105
See application file for complete search history.

(56) References Cited

U.S. PATENT DOCUMENTS 4,047,689 A * 9/1977 Grendahl ...................... 410/105
4,493,470 A * 1/1985 Engel ......................... 248/503.1

(Continued)

FOREIGN PATENT DOCUMENTS

DE  198 51 392 A1  5/1999
EP  0 336 808 A1  10/1989

(Continued)

OTHER PUBLICATIONS

International Search Report, dated Jul. 29, 2009, from corresponding PCT application.

*Primary Examiner* — Daniel J Troy
*Assistant Examiner* — Muhammad Ijaz
(74) *Attorney, Agent, or Firm* — Young & Thompson (57) ABSTRACT Devices associated with an interface that is advantageous for the customized attachment of pieces of furniture to the floor of an aircraft. The interface includes rails extending longitudinally in the aircraft cabin, able to receive anchoring devices for connecting the furniture elements to these rails. The anchoring devices include axial and radial claw clamping devices which are associated together in pairs and operated together in pairs by a single and same lever (58, 95).

17 Claims, 9 Drawing Sheets

(56) References Cited

U.S. PATENT DOCUMENTS

| | | | |
|---|---|---|---|
| 5,042,787 A | 8/1991 | Duffaud | |
| 5,489,172 A | 2/1996 | Michler | |
| 5,871,318 A * | 2/1999 | Dixon et al. | 410/105 |
| 6,068,214 A * | 5/2000 | Kook et al. | 244/118.1 |
| 6,322,126 B1 * | 11/2001 | Kraus | 296/97.9 |
| 6,488,249 B1 | 12/2002 | Girardi et al. | |
| 7,100,885 B2 * | 9/2006 | Zerner | 248/503.1 |
| 7,370,832 B2 * | 5/2008 | Frantz et al. | 244/118.6 |
| 7,506,855 B2 * | 3/2009 | Frantz et al. | 248/424 |
| 7,975,979 B2 * | 7/2011 | Bishop | 248/429 |
| 8,128,326 B2 * | 3/2012 | Hudson | 410/105 |
| 2005/0211836 A1 * | 9/2005 | Frantz et al. | 244/118.6 |
| 2009/0014584 A1 * | 1/2009 | Rudduck et al. | 244/118.6 |
| 2010/0108808 A1 * | 5/2010 | Allain et al. | 244/118.6 |

FOREIGN PATENT DOCUMENTS

| | | |
|---|---|---|
| EP | 0 853 039 A2 | 7/1998 |
| FR | 2 762 811 A1 | 11/1998 |
| GB | 2 406 877 A | 4/2005 |
| WO | 92/19496 A1 | 11/1994 |

* cited by examiner

DEVICE FOR ATTACHING A PIECE OF FURNITURE TO THE FLOOR OF AN AIRCRAFT

TECHNICAL FIELD

The invention relates to devices associated with an interface that is advantageous for the customized attachment of pieces of furniture to the floor of an aircraft.

More specifically said pieces of furniture can comprise passenger seats or "monuments", i.e. furniture such as tables or closets, containing electrical equipment or in-flight entertainment elements such as a screen or an audio-visual monitor, or storage closets for various equipment.

More specifically said interface comprises rails extending longitudinally in the aircraft cabin, able to receive anchoring devices for connecting the furniture elements to these rails.

PRIOR STATE OF THE ART

Figure 1:
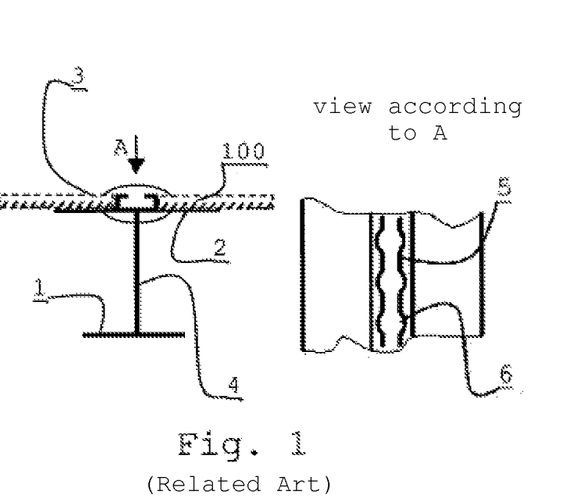
FIG. 1 shows a rail referred to as a "douglas rail" and its attachment interface according to the prior state of the art

According to the prior state of the art, pieces of furniture fitted in an aircraft cabin, such as passenger seats, are attached to standard rails known as "douglas rails". Such rails (FIG. 1) are made from of an I-, C- or Omega-shaped base, comprising a lower bearing surface (1) and an upper bearing surface (2) intended to support panels (100) forming the cabin floor, on which upper bearing surface there is a profile forming a slot (3). Said slot is opened up by a series of grooves (5) and cylindrical holes (6), said holes being regularly spaced at an interval of 25.4 mm (1 inch) between their centers. FIG. 1 shows such a rail according to the prior state of the art. This spacing pitch for the cylindrical holes permits any type of furniture to be installed and attached on these rails, where the longitudinal distance between the anchoring elements is a multiple of 25.4 mm.

The pieces of furniture are connected to this rail by tenon anchoring devices. According to an example of realization according to the prior state of the art (FIG. 2), the attachment device comprises a base made of a flat plate (11). Under this base a tenon formed of a cylindrical axis (15.1) extends, the diameter of which is slightly smaller than the width of the opening groove (5) of the rail's slot, terminated by a cylindrical or oblong shoulder (15.2), the outer diameter of which is greater than the width of the slot's opening groove (5), but slightly less than the diameter of the slot's opening cylindrical holes (6). A nut-and-bolt type of device (14) is attached on this same base, making it possible to move a retractable cylindrical centering device (16) with respect to the lower surface of the base and able to be engaged in a cylindrical opening hole of the slot (6B).

Figure 2:
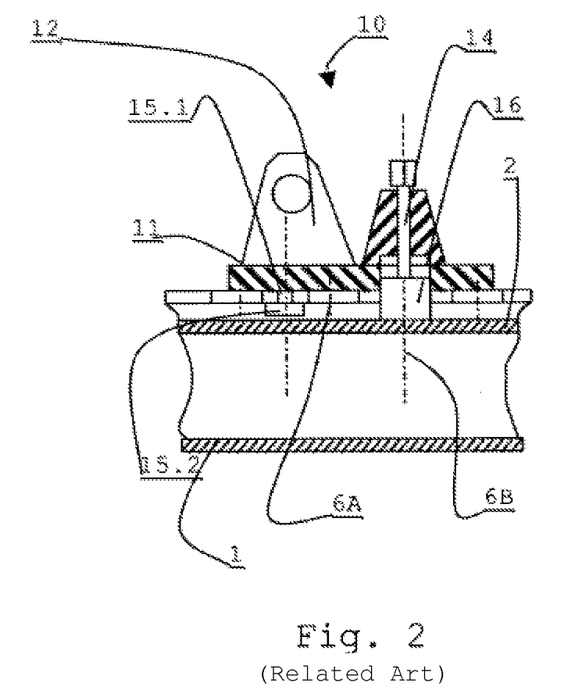
FIG. 2 shows an anchoring element in a douglas rail according to the prior state of the art.

The axis of the centering device and the axis of the tenon being advantageously separated by an odd-numbered multiple of 12.7 mm.

According to this embodiment, attaching the piece of furniture to the aircraft's floor consists of introducing said tenon into a cylindrical opening (6A) in the slot, the centering device (16) being retracted, i.e. the centering device's lower surface does not protrude below the lower surface of the base, then performing a 12.7 mm (½ inch) translation of the device assembly so that the axis of the tenon is brought approximately to the center of the groove located between two successive cylindrical holes, and so that the axis of the centering device is aligned with the axis of a cylindrical hole (6B). The translation being carried out in the direction referred to as the longitudinal direction, i.e. parallel to a straight line connecting the centers of two cylindrical opening holes of the slot, this direction coinciding with that of the straight line perpendicular to the axis of the centering device and the axis of the tenon.

The centering device can then be introduced in a hole (6B) by moving it using the nut-and-bolt system (14), so as to lock everything longitudinally and transversely. By continuing to operate the screw, the lower end of the centering device comes into contact with the bottom of the rail, lifting up the base and tenon until the latter's shoulder comes into contact with the lower surface of the upper part of the slot (3), resulting in the assembly's vertical locking as a result of this tightening.

Such an attachment principle or variants of this principle are currently used to attach pieces of furniture such as passenger seats in aircraft. According to the prior state of the art such pieces of furniture are anchored to the aircraft floor on at least two rails by four, or more, anchoring devices of this type, distributed on each of at least two rails. The person skilled in the art will understand that this configuration is statically indeterminate and that it will be difficult to obtain a correct position for each centering device with respect to each cylindrical hole in question of the slot, unless the rails, the anchoring devices and the interface between the piece of furniture and said anchoring devices are manufactured with particular precision, precision manufacturing that leads to high production costs.

In addition, this solution of the prior state of the art presents several inconveniences, in particular:

- the presence of the protruding slot on the top of the rail makes it difficult, in the areas of the airplane where such rails are installed, to have a floor that is completely flat and has a uniform appearance. Actually, the panels forming the floor are attached to the rail on either side of the slot, which remains visible and must be closed, generally by a plastic cover. In addition to the unaesthetic appearance of a non-uniform floor, this configuration complicates the installation of said floor and imposes the thickness of the floor panels that, for aesthetic reasons, must be such that the surface of the floor is flush with the top of the slot.
- Installing and attaching the piece of furniture requires a translation of the latter to be carried out. However, it is not easy to carry out this translation when said piece of furniture is placed on the top of the rails, especially in a restricted space. Indeed, on the one hand it is difficult to control the distance moved during this translation, and on the other hand the piece of furniture has a tendency to pivot and get stuck instead of performing a linear translation.
- Because of these inconveniences, reconfiguring the layout of the furniture fitted inside an aircraft is a long and arduous task. Nevertheless, this option of quickly reconfiguring the interior furniture layout is a requirement of the airlines.

The purpose of this invention is to solve these deficiencies of the prior state of the art.

DESCRIPTION OF THE INVENTION

The subject of the invention is a combination of an advantageous new type of attachment rail and an advantageous attachment device that work together to solve the deficiencies of the prior state of the art, and in particular:

- to enable pieces of furniture to be installed and attached without needing to perform a translation of them
- to enable said pieces of furniture to be rapidly installed and attached, including in a restricted space To ensure an isostatic fitting of the assembly, thus one that is more tolerant with regard to manufacturing tolerances To permit a uniform floor to be installed in which the rails are concealed And at the same time to be able to withstand the stresses generated by the sudden decelerations experienced by the pieces of furniture, especially in cases of emergency or forced landings.

According to the invention, the device for installing and attaching pieces of furniture to an aircraft floor comprises at least one rail extending longitudinally, said rail comprising along a transverse section a flange forming a lower bearing surface, a flange forming an upper bearing surface, the two flanges being connected by at least one web, a flange forming an attachment interface made of an upper flat surface, said interface being drilled by cylindrical through holes regularly spaced according to a pitch of a multiple of 25.4 mm along the longitudinal axis such that the upper surface of the attachment interface is located under the lower surface of the flange forming the upper bearing surface. In this way the floor panels can cover the attachment interface away from the anchoring points of the pieces of furniture.

The longitudinal direction coinciding with the longitudinal axis of the fuselage. Advantageously, the upper bearing surface is made of two flanges, the attachment interface being located between these two flanges, increasing the mechanical stability of the rail.

The pieces of furniture are attached to this rail via two anchoring assemblies:

a front anchoring assembly able to withstand longitudinal and transverse dynamic forces and a rear anchoring assembly able to withstand vertical pull-out forces The front is understood to be the front of the aircraft, the cockpit side, the rear being the tail side. In effect, as the center of gravity of the pieces of furniture is located above the floor, during a strong deceleration along the longitudinal axis, such as can occur during a forced landing, this deceleration tends to tip the furniture forward and thus tends to pull out the rear attachment devices, not the front ones. The distribution of functions—resistance to stresses along the longitudinal axis and resistance to pull-out stresses—between the front and rear anchoring devices makes it possible, firstly, to produce lighter devices and, secondly, to reduce the static indeterminacy of the assembly.

Equally advantageously, the device for installing and attaching pieces of furniture according to the invention comprises at least one shear pin and a device for clamping by flaring claws. The shear pin permits the load bearing of longitudinal and transverse forces, while the claw clamping system firstly makes it possible to ensure resistance to pull-out and secondly can be introduced into a cylindrical hole of the interface without moving the furniture longitudinally. The principle of clamping by flaring claws firstly enables an axial introduction of said claws, not flared, into a cylindrical hole of the attachment interface and then, by flaring the claws, to ensure clamping that is both axial, resistant to pull-out, and radial in said hole. Each component device for clamping by flaring claws comprises at least two claws and at most 4 claws that are independent. The fact that each claw is independent makes it possible, firstly, to increase the transverse cross-section of these claws, and thus to increase their mechanical resistance, and it also enables almost all of the flaring force to be converted into clamping force.

Figure 3:
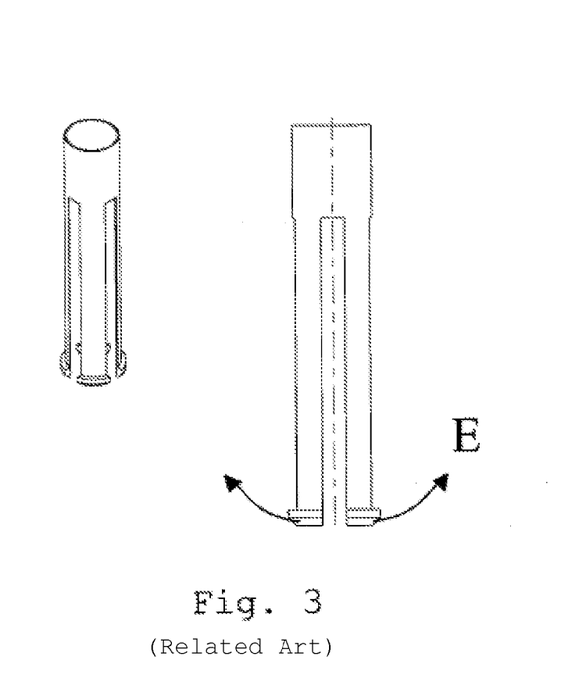
FIG. 3 shows an embodiment of claws of a claw clamping device according to the prior state of the art

According to the prior state of the art, there are indeed many claw clamping devices such as, for example, described in EP0336808 in which the claws are made from a hollow cylinder having a shoulder at one end, said shoulder forming the claws. This hollow cylinder (FIG. 3) is slotted over a part of its length starting from the shoulder end. Each strip of material remaining between each slot forms a claw, said strips remaining connected to each other by the non-slotted part of the hollow cylinder. In this configuration the flaring of the claws is accomplished by the elastic deformation of these strips via a spreader. According to this prior state of the art, it is essential for the strips forming the claws to be sufficiently thin, so that the flaring stress (E) causes only elastic, not plastic, deformations of the strips. Moreover, a part of the flaring force is used just for this elastic deformation and therefore is not converted into clamping force.

Using independent claws permits these inconveniences of the prior state of the art to be overcome. Using two or four claws makes it possible to maximize the contact area on the lower surface of the clamping interface, ensuring as a result a sufficient area of resistance to burring with regard to the absorption of pull-out forces, while optimizing the absorption of radial stresses. According to a first embodiment the claw clamping device is made such that the flaring of the claws basically leads to radial clamping on the wall of a hole of the attachment interface. In this configuration the attachment device's shear pin or pins are, for example, made so that their diameter is slightly less than the diameter of the interface's holes such that the pin's adjustment in the hole presents clearance. Alternatively said pins can be replaced by "locatings", i.e. oblong-shaped pins, the maximum radial width of which is slightly less than the diameter of the cylindrical attachment holes, and the radial casing surface of which is a cylindrical portion whose curvature radius is substantially less than the diameter of the cylindrical attachment holes. In these conditions, the area of contact between the locating and the radial wall of the attachment hole tends to a linear contact. In this way, such locatings, or shear pins presenting clearance with the attachment holes, do not cause static indeterminacy for positioning the furniture on the rails. The device or devices for clamping by flaring claws can therefore be easily introduced into the corresponding holes of the attachment interface. The radial flaring of the claws enables the furniture to be locked in the plane of the aircraft floor. According to this first embodiment the locking of the furniture in the direction perpendicular to the plane of the floor is obtained by the specific shape of the claws and their axial spring connection with the anchoring device.

According to a second embodiment the claw clamping device is able to produce axial clamping on the lower surface of the attachment interface. According to this second embodiment the attachment device comprises at least one shear pin such that its diameter produces a sliding adjustment with the cylindrical holes of the attachment interface, ideally this at least one pin is located on one of the front anchoring assemblies. This adjusted pin is associated to pins or locatings also fitted in holes of the attachment interface and distributed on the other anchoring assemblies of the attachment device. According to this embodiment the claw clamping devices are placed on the rear anchoring assemblies and comprise 2 to 4 claws, the flaring of which is produced by an operating device pulling the claws over a spreader that is fixed. Thus in the unclamped, or unflared, position the diameter of the shouldered part of the claws is less than the diameter of the hole of the attachment interface such that the claws can be easily introduced into said hole, the shouldered end thus being located under the lower surface of the attachment interface. The spreader, ideally bullet-shaped, is fixed opposite the anchoring assembly on which this clamping device is installed. The flaring is produced by pulling the claws towards the lower surface of the attachment interface, for example, via a nut-and-bolt system. During this movement the shouldered end of the claws is widened by the contact of the claws' lower surface on the spreader. In these conditions the outer diameter of the shouldered part is greater than the diameter of the attachment interface's hole and touches the lower surface of this interface, thus enabling axial clamping to be produced by continuing to pull on the claws. In the same way as the previous embodiment, this configuration makes it possible to avoid static indeterminacy when installing the piece of furniture while making sure that it is effectively anchored.

According to a third embodiment, each claw clamping device is retractable so that it does not protrude under the attachment device and allows the sliding of the furniture equipped with this device on the upper surface of the attachment interface.

According to a fourth embodiment, the attachment device associates a claw clamping device producing axial clamping, to the claw clamping device producing a radial clamping, on the lower surface of the attachment interface. According to this embodiment, shear pins presenting clearance with respect to the cylindrical holes of the attachment interface or locatings are distributed over the front and rear anchoring assemblies. The at least one radial claw clamping device enables the furniture to be locked essentially in the plane of the floor. Then, the clamping of the axial clamping device permits it to be locked more effectively in the direction perpendicular to the floor. Compared to other embodiments, this enables the same effectiveness of positioning, clamping and retention of the furniture assembly to be obtained with smaller diameter holes in the attachment interface. This results is an overall reduction in the mass of the attachment device assembly and/or increased resistance of the rail.

Advantageously, each claw clamping device is operated by a lever equipped with a locking system making it easier to install furniture without tools. The locking system of said lever makes it possible to avoid it being operated accidentally, which may lead to the furniture becoming detached from the floor.

Ideally the radial and axial claw clamping devices are associated together in pairs and operated together in pairs by a single and same lever with a locking system, this configuration making it possible to speed up the installation and removal of furniture and also to ensure that axial and radial clamping occur in the correct order, i.e. radial clamping first and then axial clamping.

DETAILED DESCRIPTION

Figure 4:
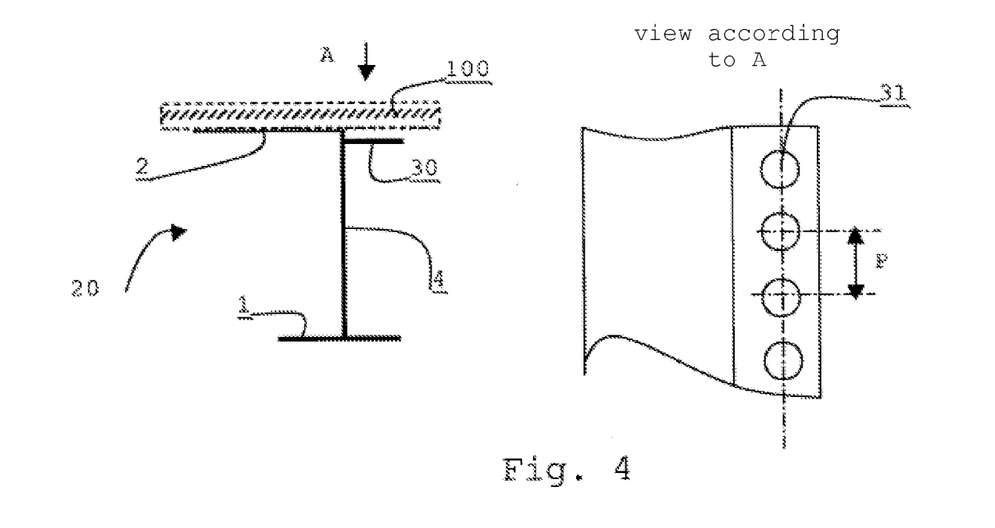
FIG. 4 shows an embodiment of a rail forming an attachment interface according to the invention

A rail forming an attachment interface according to the invention (FIG. 4) comprises a lower rail (1), an upper rail (2) able to bear floor panels (100), and a flange forming an attachment interface (30) where the upper surface is located under the upper surface of the flange (2) able to bear the floor panels (100) such that, in the parts of the rail located outside areas of contact with anchoring assemblies, the floor panels cover the attachment interface so as to present a uniform floor. The attachment interface is drilled with cylindrical holes (31) regularly spaced at a pitch (P) of 25.4 mm (1 inch). Advantageously, these cylindrical holes have a diameter of between 10 and 18 mm.

According to an advantageous embodiment of this attachment rail (FIG. 5), this comprises two upper surfaces (2) intended to bear floor panels and two vertical webs (4 and 4bis), the attachment interface (30) being located between the upper surfaces (2). This configuration makes it possible to use the anchoring elements (50) protruding under the pieces of furniture (110) as guides in the groove formed by the attachment interface (30) and the web segments (4) contained between this attachment interface and the upper flange surfaces (2).

Figure 5:
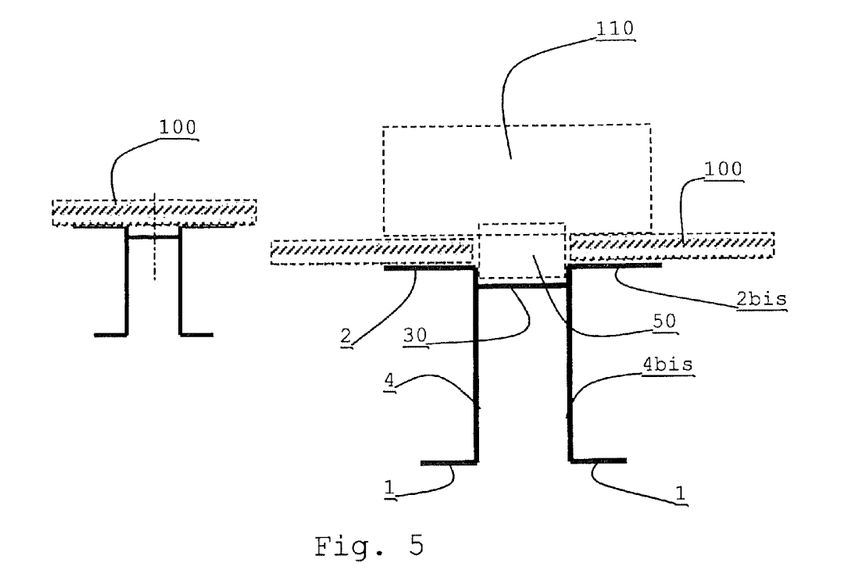
FIG. 5 shows a second advantageous embodiment of the rail forming the attachment interface according to the invention

Advantageously, the upper surface of the attachment interface and/or the lower surface of the anchoring devices (50) can be covered with a coating facilitating sliding, such as polytetrafluoroethylene (PTFE). Thus it is easier to slide the piece of furniture into its anchoring position. Such rails are, for instance, used for attaching pieces of furniture such as passenger seats to an aircraft floor.

Figure 6:
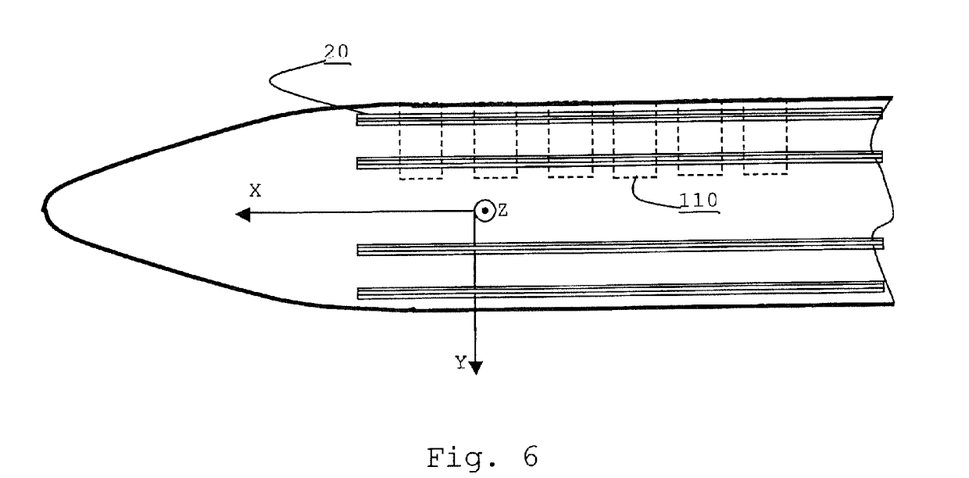
FIG. 6 shows an example of the installation of such rails in the fuselage of an aircraft
Figure 7:
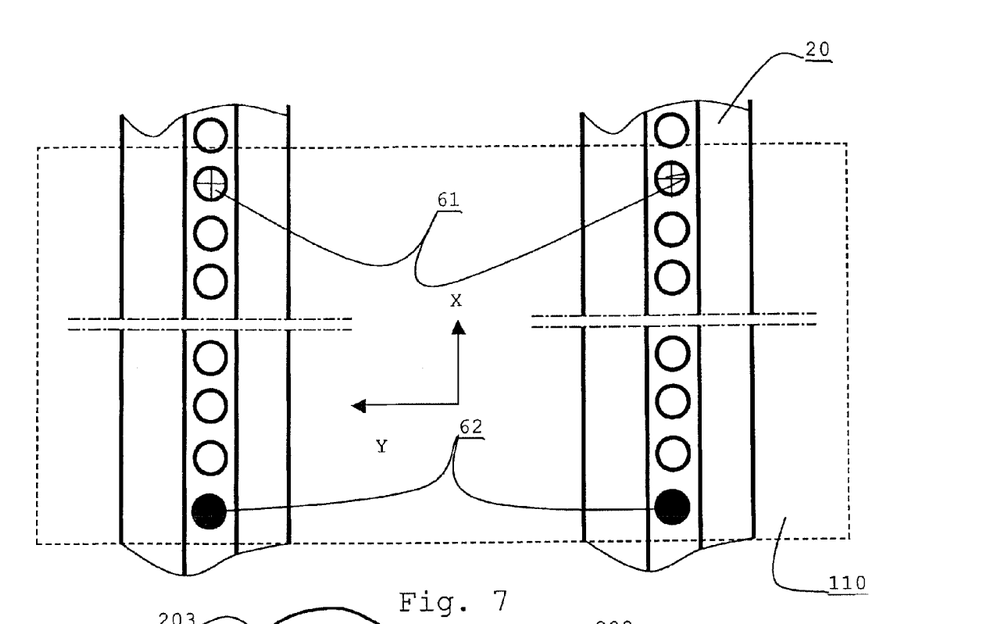
FIG. 7 shows an example of the distribution of the centering devices and clamping devices on a device for attaching a piece of furniture

To do this, in the case of a single-corridor fuselage (FIG. 6), the rails (20) are arranged in pairs for each row of seats, parallel to the longitudinal axis (X) of the fuselage, said seats being turned forwards (positive X direction). In this configuration, in the case of a forced landing of the aircraft, the maximum deceleration (90 m/s$^2$) is directed in the positive X direction. The center of gravity of the pieces of furniture being located above the floor, this deceleration tends to tip said pieces of furniture in a rotation around the Y-axis. Thus, such a piece of furniture (FIG. 7) will be more effectively retained if the axial retention and anchoring devices are arranged towards the rear (the front being in the positive X direction, 62) the anchoring devices located in the front of the piece of furniture being reduced to simple shear pins (61). The attachment device for a piece of furniture comprises several anchoring devices that work with the rails (20) so as to best distribute the forces.

An anchoring device (50.1) according to the invention (FIG. 8) comprises an essentially flat base (51), a shear pin (61) protruding below said base's lower surface. Advantageously the end of the pin (61) is semi-circular so as to make it easier to introduce it into a hole (31) of the attachment interface. The anchoring device according to the invention further comprises a device for radial clamping by flaring claws, able to be fitted in a second hole (31.1) of the attachment interface, the axis of which is separated by a multiple of 25.7 mm from the axis of the pin (61) in the longitudinal direction (X). Said clamping device comprises at least two independent claws (52) that, firstly, lie on an inner shoulder (59) of the body (60) of the clamping device and being, in their upper part, held against this shoulder by spring washers (53) referred to as "Belleville washers" acting on a flat washer (54) and compressed by a ring (55) screwed into the device's body. An operating rod (56) encloses a ball (57) that is fitted between the claws. This operating rod is moved, as an example, by a lever (58) hinged around an axis (200) secured to the body (60) of the device. By operating the lever (58) in direction R1 this, because of its eccentric profile with regard to the axis (200), presses on the operating rod (56) which makes the ball descend between the claws (52) causing them to be spread until the claws come into contact with the walls of the hole and cause their clamping. The lever (58) can be locked in this position by standard devices such as a padlock passed between a fixed point and the hole (201).

Figure 8:
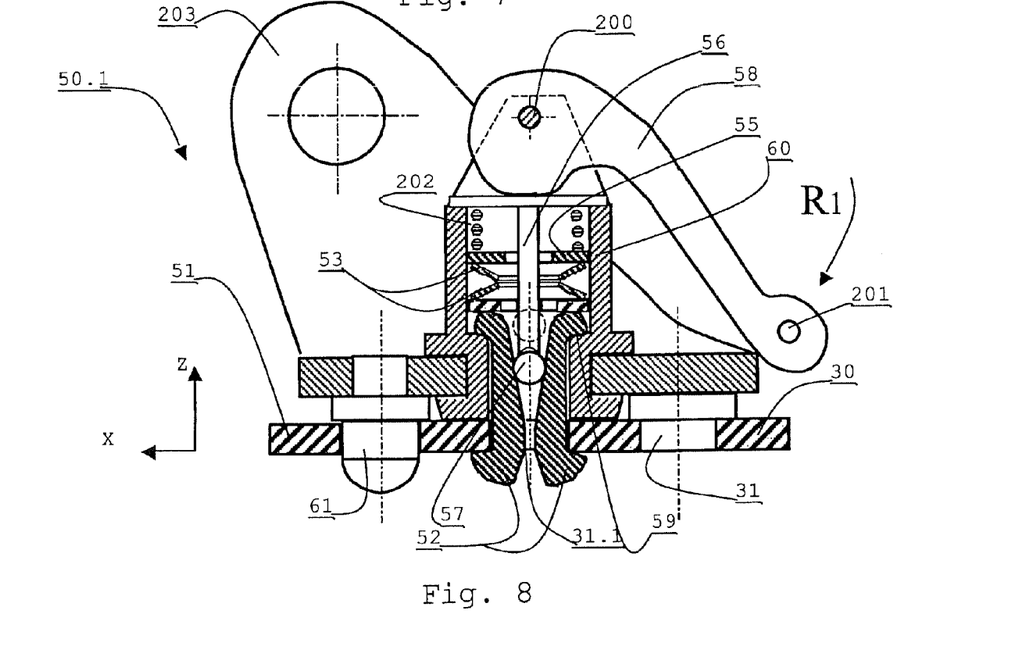
FIG. 8 shows an example of the realization according to the invention of an anchoring element comprising a device for radial clamping by flaring claws
Figure 9:
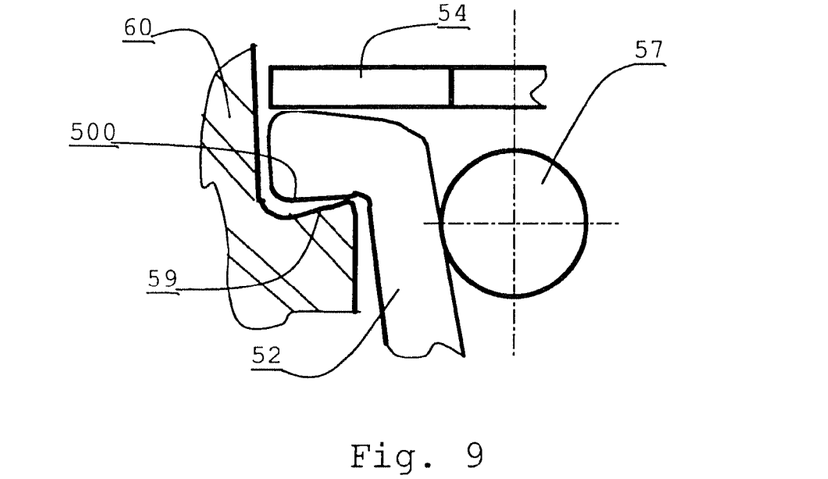
FIG. 9 shows a detail of the seating of the claws enabling radial clamping to be obtained

Advantageously the ball (57) is linked only in translation to the operating rod (56) such that when this rod is moved the ball can roll over the inner surface of the claws (52) so as to limit friction and convert the largest part of the operating force into effective clamping. When the lever (58) is moved in the opposite direction, the vertical pressure applied by the part forming the eccentric of the lever (58) is reduced, the spring (202) pushes the operating rod (56) upwards, bringing the ball (55) up also. The pushing force directed downwards, produced by the spring washers (53) pressing on the upper part of the claws via the washer (54), causes their radial tightening. This tightening is caused by the special profile of the upper end of the claws and the shoulder (59), as the detail in FIG. 9 shows.

Once the claws are fully tightened, their outer casing diameter is less than the diameter of the hole (31) of the attachment interface and the anchoring device can be easily detached from the rail (20).

Figure 10:
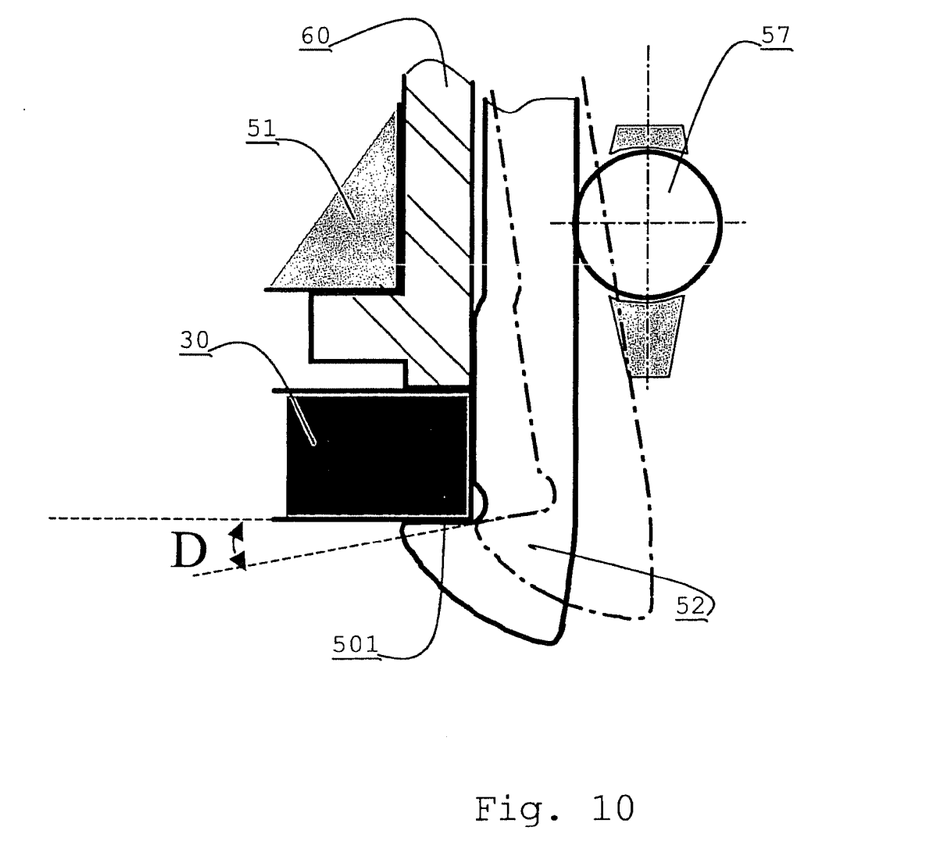
FIG. 10 shows a detail of the profile of the end of the radial clamping claws

During clamping, the special profile of the end of the claws (501) (FIG. 10) enables them to produce a certain axial clamping force; nevertheless the intensity of this clamping force is dependent on, firstly, the distance between the shoulder (59) on which lie the claws and the lower surface of the attachment interface (30) and, secondly, on the distance between the two shoulders (500 and 501) of the claw ends. For clamping to occur, the distance between the shoulders of the claws must be slightly less than the distance between the shoulder of the body (59) and the lower surface of the attachment interface (30). Advantageously, in order to make the intensity of this axial clamping less dependent on these chains of dimensions it is possible to realize the profile of the shoulder (59) as a separate piece, this coming into axial contact with respect to the body (60) via a Belleville washer type of spring element. However, according to this embodiment, the axial clamping force obtained will depend upon the rigidity of this spring element.

According to another embodiment (FIG. 11) the clamping device can be designed to provide essentially axial clamping. According to this embodiment, the clamping device comprises a body (70) and an inner shaft (71) connected to the body. A bullet-shaped spreader (73) is connected to the shaft by 4 arms. Claws (72) are retained axially in a cover (74) able to be moved in the shaft (71), and rotationally locked with respect to the latter by notches holding the attachment arms of the bullet-shaped spreader (73). The cover (74) is connected to an operating rod (75) that can, for instance, take the form of a threaded rod that can be moved axially by a nut (76).

Figure 11:
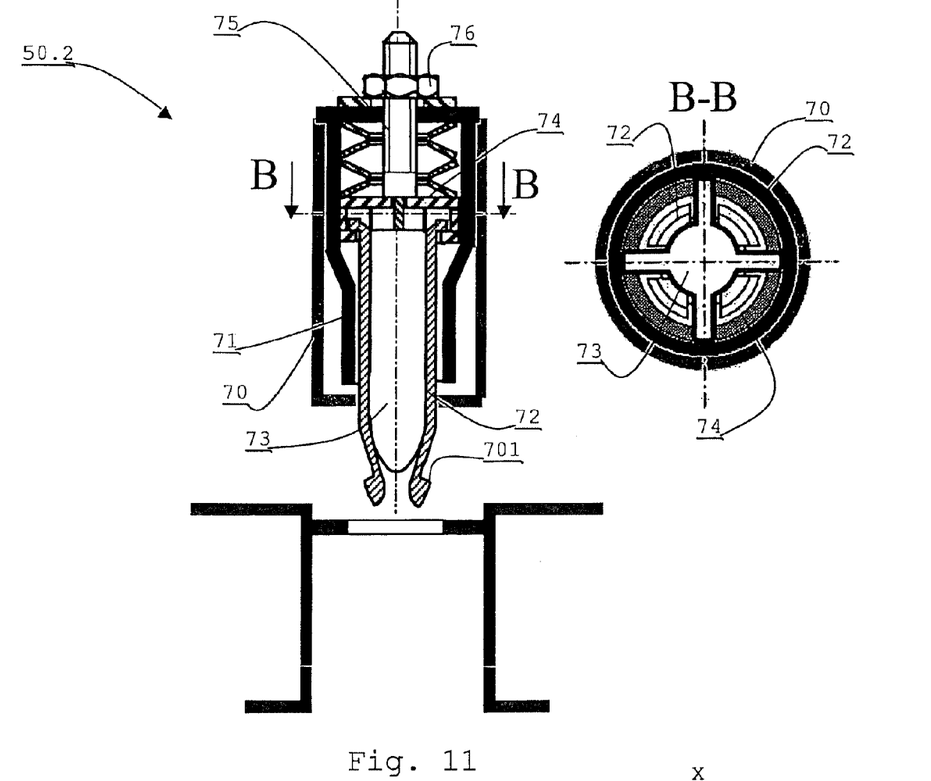
FIG. 11 shows an example of a device for axial clamping by flaring claws

When the nut is loosened the spring elements (77) push the cover (74) and claws downwards. The lower ends of the claws are tightened by elasticity, and their casing diameter is then substantially less than the diameter of the cylindrical holes (31) of the attachment interface, which enables them to be easily introduced into one of these holes. In this configuration the end shoulders (701) of claws as well as the lower end of the bullet-shaped spreader (73) are located several millimeters under the lower surface of the attachment interface.

The nut is then tightened, which results in the cover (74) and claws (72) being moved upwards whereas the bullet-shaped spreader (73) remains fixed since it is connected to the shaft (71). During this movement the end of the claws is widened by the end of the spreader, the casing diameter of the end of the claws is increased by the latter's elastic deformation, generated by the profile of the bullet-shaped spreader (73). The casing diameter of the end of the claws becomes greater than the diameter of the cylindrical hole (31) and the end shoulder (701) of the claws comes into contact with the lower surface of the attachment interface (30) close to the cylindrical hole (31). Continuing to tighten the nut (76) leads to the axial clamping of the attachment device.

While the shape of the bullet-shaped spreader (73) makes it possible to obtain a radial expansion of the claws (72) and thus a certain radial clamping in the cylindrical hole (31), these radial clamping capabilities are based on the elastic expansion abilities of the claws and are therefore limited. In addition, too great a radial clamping is detrimental to the optimum working of the axial clamping device (50.2).

According to the invention the claw clamping device, whether it be radial clamping (50.1) or axial clamping (50.2), advantageously comprises 2 to 4 separated individual claws (52, 72).

These claws are made from steel presenting a high level of mechanical tensile strength and of mechanical resistance to shear and fatigue as well as significant resilience to withstand dynamic stresses generated in cases of forced landings. Such characteristics can be obtained with steel alloys that have undergone a hardening and tempering process, such as 40CrMoVa12 (40CDV12 containing 0.4% carbon, 4% chrome, molybdenum and vanadium) or 35NiCrMo16 (35NCD16 containing 0.5% carbon, 4% nickel, chrome and vanadium) types of steel. This type of steel having received this type of processing is especially recommended for the claws of the radial clamping device. In contrast to the devices of the prior state of the art where the claws, connected to each other at their end (FIG. 3) must be able to be elastically deformed at their base in order to obtain their flaring. The claws arranged according to the invention do not undergo deformation in the case of the radial clamping device (50.1). Thus it is possible to realize thick claws (52), able to withstand radial stresses in the X and Y directions without the help of shear pins (61). In the case of the axial clamping device (50.2) the claws undergo elastic deformation at their end during their flaring. They will be advantageously made from a steel having undergone a surface hardening process, either by case hardening or by nitride hardening followed by tempering. For example, steel 40CDV12 may be used following an air surface hardening process after surface heating with a laser, or a 27MnCr5 (27MC5 containing 0.27% carbon, 1,25% manganese and chrome) type of steel after nitride hardening and surface hardening. Alternatively, claws (72) made from a titanium alloy may be used for the axial clamping device (50.2): this alternative permits lighter claws to be used having mechanical resistance close to that of steel while having a capacity for elastic deformation that is 2 times greater.

Figure 12:
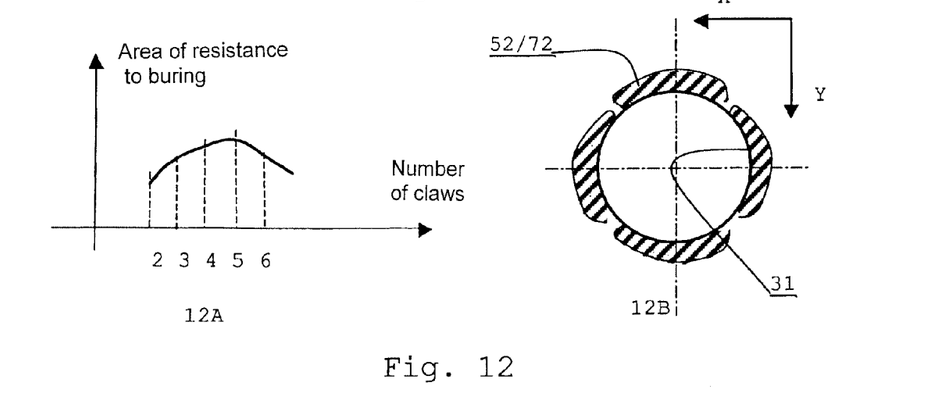
FIG. 12A shows the change in the area of resistance to burring according to the number of claws of the claw clamping device
FIG. 12B shows the optimum positioning of claws in a hole of the attachment interface

The resistance to pull-out along the Z direction of clamping devices according to the invention, whether axial or radial, is given by the resistance to burring of the area of contact between the shoulders of the claws (501, 701) and the lower surface of the attachment interface (30). For a given diameter and thickness, this area of resistance to burring is maximum for a set of 5 claws (FIG. 12A). However a device comprising 4 claws (FIG. 12B) is able to withstand transverse forces along the X and Y axes more effectively, which is why using 4 claws forms the better compromise for the attachment's resistance in all stress directions (X, Y and Z).

According to another embodiment it is advantageous that the clamping device can be retractable (FIG. 13) so that it does not protrude under the lower surface of the attachment device (50) and thus makes it possible to slide the furniture (110) equipped with its anchoring device in the channel created by the upper surface of the attachment interface (30) and the lateral parts of the webs (4, 4bis) of the rail between this surface and the upper surfaces (2). The pieces of furniture (110) can thus be easily pushed in these channels until they reach their final position where they are fastened. Advantageously the lower surface of the body (70) in contact with the upper surface of the attachment interface (30) is coated with a layer of a material facilitating sliding, such as polytetrafluoroethylene.

Figure 13:
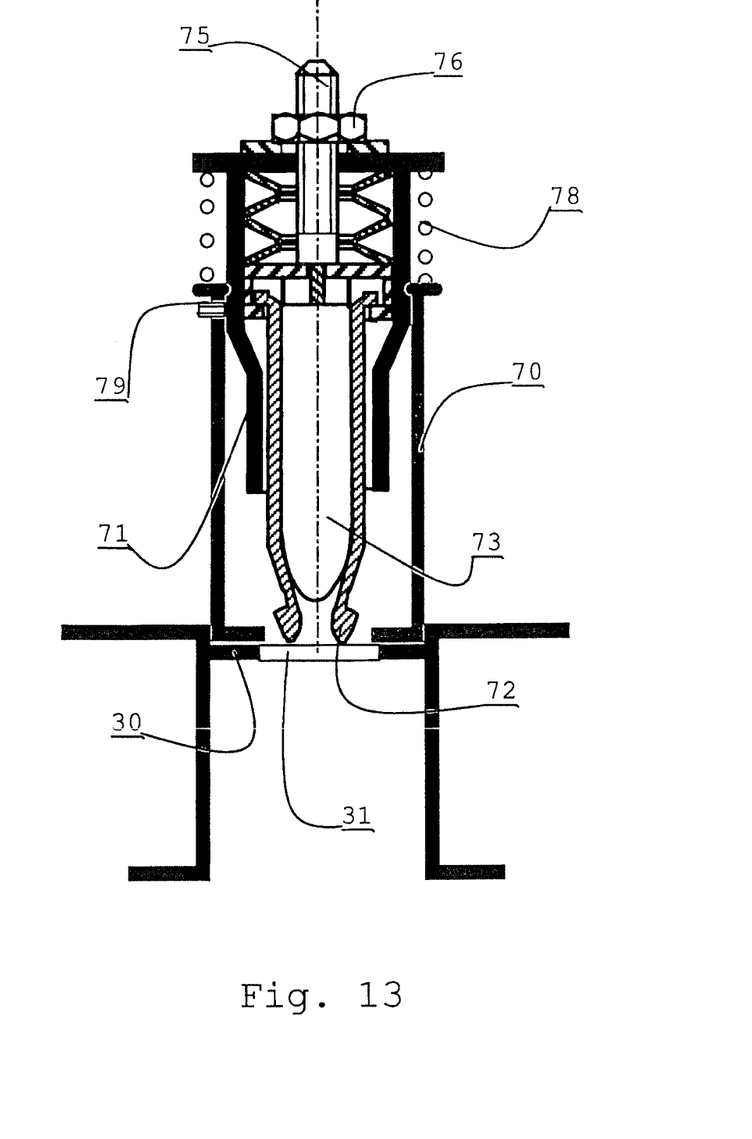
FIG. 13 shows an example of a retractable axial clamping device

According to this embodiment, the shaft (70) is no longer fully connected to the body (71) but has a sliding connection in the Z direction and is rotationally locked with respect to the body, for instance via a rod (79) screwed in the body (70) and fitting into a groove of the shaft (70).

In the "rest" position, a spring (78) pushes the shaft (71), spreader (73), cover (74) and claws (72) assembly, so that the claws (72) do not protrude under the body (70).

When the device is above a hole (31), it is just necessary to push the top of the shaft (70) to make the claws (72) and spreader (73) penetrate into the hole (31) and then tighten the nut (76) while keeping the shaft in this position in order to obtain axial clamping.

The axial clamping device can be modified in a similar way (FIG. 15) in order to be retractable. Advantageously, the special features of clamping modes of various alternatives for realizing attachment devices can be combined to produce an anchoring device ensuring pieces of furniture (110) are locked both radially and axially, without generating a statically indeterminate fitting for said pieces of furniture, and thus ensuring their easy fitting.

According to a first embodiment of this combined device (FIG. 14) the devices are joined together in pairs on each rear anchoring device by a plate (51). The two clamping devices can be controlled simultaneously by a single lever (58). For instance the operation (R2) of this lever (58) in rotation around an axis (200) connected to the body (60) of the radial clamping device pushes on the operating lever (56) of this device and pulls on the operating rod (75) of the axial clamping device (50.2) by means of a link (210). The progression of the eccentric part of the lever (58) pressing on the operating rod of the radial clamping device (56) and the articulation position of the link (210) on the lever (58) define the relative intensities of axial and radial clamping during this operation. Ideally the radial clamping must be completed before there is significant axial clamping to ensure the anchoring device is centered with respect to the interface holes (31).

Figure 14:
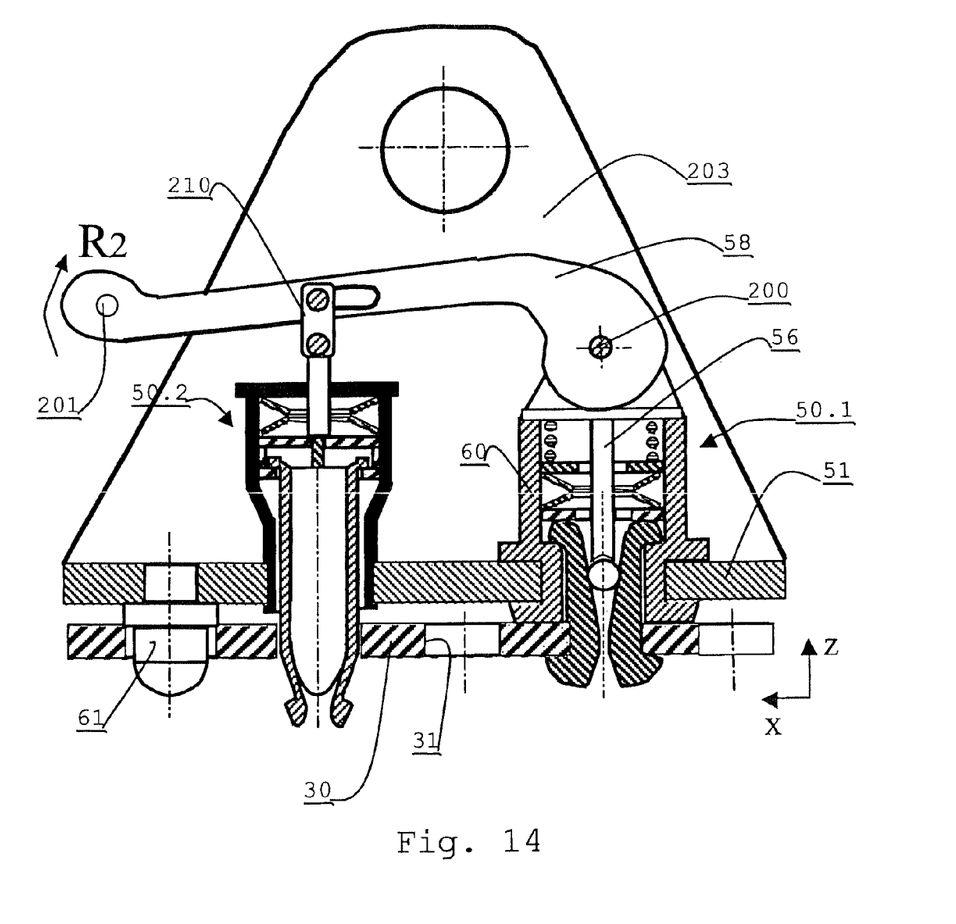
FIG. 14 shows an embodiment of an anchoring element comprising two associated claw clamping devices and operated by the same lever, one of the devices delivering radial clamping and the other delivering axial clamping.

Once the clamping is finished the lever (58) can be locked in this position by, for instance, a padlock passed in the end hole (201) and a fixed point of the device.

A shear pin (61) presenting clearance in the interface hole (31), or a locating can be associated to these two devices on the same plate (51) to provide additional resistance to transverse forces (X, Y).

According to another combined embodiment (FIG. 15), two retractable clamping devices can be combined on the rear anchoring device, the front anchoring device being limited to a shear pin (61). The combined operation of both clamping devices is carried out by a lever (95) able to be activated in translation (V) and in rotation (R3). The lever (95) has a pivot link with respect to a plate (80) connecting the shaft (71) of the axial clamping device to the body (60) of the radial clamping device. It is just necessary to push (V) on this lever (95) to make the claws protrude. Then, to obtain clamping, to turn the lever (95 according to R3). This is connected to a toothed wheel (92) that meshes, firstly, with a pinion (91), itself meshing with a rack (90) connected to the cover (74) of the axial clamping device and, secondly, to another pinion (93) that drives a cam (94) acting on the operating rod (56) of the radial clamping device. Thus, the rotation of the lever (95) leads to traction on the cover (74) of the axial clamping device and pushing on the operating rod of the radial clamping device. Once it is in the "clamped" position the lever is locked in this position by any means known to the person skilled in the art.

Figure 15:
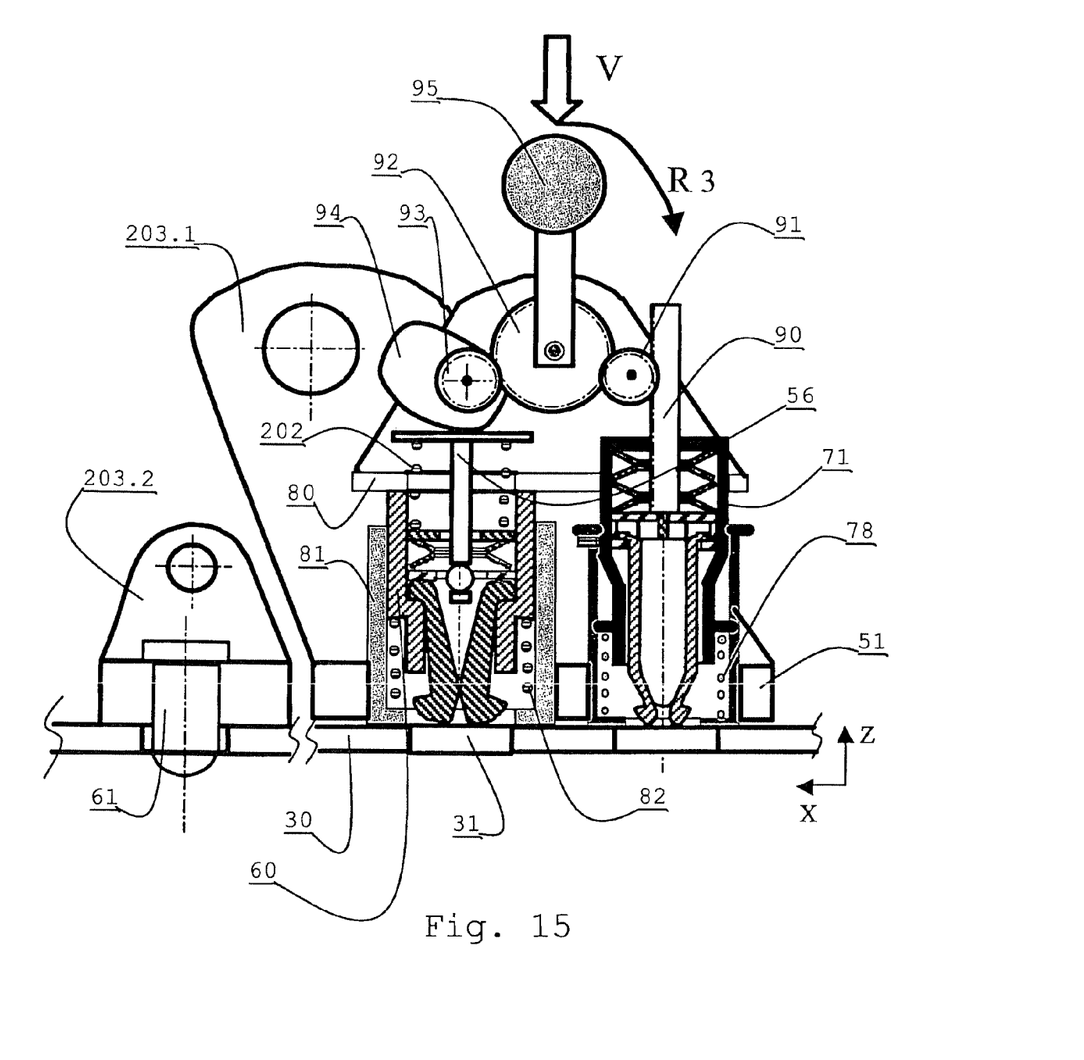
FIG. 15 shows an anchoring device combining a retractable axial clamping device and a retractable radial clamping device controlled by the same operating lever

The relative intensities of the axial and radial clamping during the clamping process are controlled by the ratio between the two gear ratios.

This embodiment permits pieces of furniture to be positioned easily, by sliding in the channels of the rails, then quickly clamping the piece of furniture in position solely by operating the single lever (95) in vertical translation (V) then in rotation (R3), the position being isostatic because of the distribution of points on the attachment interface and the clearance of the shear rods (61) in the holes (31) of this attachment interface.

The invention claimed is:

1. A device for installing and attaching pieces of furniture to an aircraft floor, the device comprising:
    at least one rail extending longitudinally, said rail comprising:
        a lower flange along a transverse surface forming a lower bearing surface,
        an upper flange forming an upper bearing surface,
        at least one web connecting the lower flange and the upper flange, and
        an attachment interface flange forming an attachment interface made of an upper flat surface, said attachment interface being drilled by cylindrical through-holes regularly spaced according to a pitch of a multiple of 25.4 mm along the longitudinal axis, the upper surface of the attachment interface flange being located under the lower surface of the upper flange forming the upper bearing surface;

at least one anchoring assembly configured to attach a piece of the furniture and the at least one rail, the anchoring assembly comprising at least one clamping device including at least two claws configured to be inserted into one of the through-holes in the attachment interface flange; and a locking system including at least one lever configured to operate the at least one clamping device, the locking system being configured to cause a lower portion of the at least two claws inserted into one of the through-holes to be clamped to attach the anchoring assembly to the attachment interface flange by the at least two claws engaging the attachment interface flange through the one through-hole and contacting a lower surface of the attachment interface flange adjacent the one through-hole by vertical movement of the lever of the locking system causing an upper portion of the at least two claws to engage notches within the at least one clamping device, in order to facilitate resistance to pull-out through the one through-hole in a vertical direction of the at least one clamping device with respect to the attachment interface flange.

2. The device according to claim 1, wherein the upper bearing surface comprises two upper flanges, the attachment interface being located between the two upper flanges.

3. The device according to claim 1, wherein the at least one anchoring assembly includes
a front anchoring assembly configured to withstand longitudinal and transverse dynamic forces, and
a rear anchoring assembly configured to withstand vertical pull-out forces.

4. The device according to claim 3, wherein the at least one anchoring device includes
at least one shear pin, and
a device for clamping by flaring claws.

5. The device according to claim 4, wherein the clamping device comprises at least two, and no more than four, claws that are independent.

6. The device according to claim 5, wherein the claw clamping device is configured to perform radial clamping on the wall of a hole of the attachment interface.

7. The device according to claim 5, wherein the claw clamping device is configured to perform axial clamping on the lower surface of the attachment interface.

8. The device according to claim 6, wherein an axial clamping claw clamping device configured to perform axial clamping is associated with the radial clamping claw clamping device configured to perform radial clamping on the lower surface of the attachment interface.

9. The device according to claim 6, wherein the clamping device is retractable so that the clamping device does not protrude under an attachment device and allows sliding of the furniture, equipped with the attachment device, on the upper surface of the attachment interface.

10. The device according to claim 8, wherein the radial clamping claw clamping device and the axial clamping claw clamping device are associated together in pairs and operated together in pairs by a single and same lever of the at least one lever.

11. The device according to claim 2, wherein the at least one anchoring assembly includes
a front anchoring assembly able to withstand longitudinal and transverse dynamic forces, and
a rear anchoring assembly able to withstand vertical pull-out forces.

12. The device according to claim 7, wherein the claw clamping device is retractable so that the claw clamping device does not protrude under an attachment device and allows sliding of the furniture, equipped with the attachment device, on the upper surface of the attachment interface.

13. The device according to claim 8, wherein each of the radial clamping claw clamping device and the axial clamping claw clamping device is retractable so that the radial clamping claw clamping device and the axial clamping claw clamping device do not protrude under the attachment device and allow sliding of the furniture, equipped with the attachment device, on the upper surface of the attachment interface.

14. The device according to claim 9, wherein the radial clamping claw clamping device and the axial clamping claw clamping device are associated together in pairs and operated together in pairs by a single and same lever of the at least one lever.

15. A device for installing and attaching pieces of furniture to an aircraft floor, the device comprising:
at least one rail extending longitudinally, said rail comprising:
at least one lower flange along a transverse section forming a lower bearing surface,
at least one upper flange forming an upper bearing surface,
at least one web connecting the at least one lower flange and the at least one upper flange, and
an attachment interface flange forming an attachment interface made of an upper flat surface, the upper surface of the attachment interface flange being located under the lower surface of the at least one upper flange forming the upper bearing surface, the attachment interface comprising a plurality of through-holes regularly spaced along the longitudinal axis of the at least one rail;
an anchoring assembly configured to attach a piece of the furniture and the at least one rail, the anchoring assembly comprising at least one clamping device including at least two claws configured to be inserted into one of the through-holes in the attachment interface flange; and
a locking system including at least one lever configured to operate the at least one clamping device, the locking system being configured to cause a lower portion of the at least two claws inserted into one of the through-holes to be clamped to attach the anchoring assembly to the attachment interface flange by the at least two claws engaging the attachment interface flange through the one through-hole and contacting a lower surface of the attachment interface flange adjacent the one through-hole by vertical movement of the lever of the locking system causing an upper portion of the at least two claws to engage notches within the at least one clamping device, in order to facilitate resistance to pull-out through the one through-hole in a vertical direction of the at least one clamping device with respect to the attachment interface flange.

16. The device according to claim 15, wherein the at least one clamping device is configured to perform radial clamping on the wall of the through-hole into which the at least one clamping device is inserted.

17. The device according to claim 15, wherein at least one clamping device is configured to perform axial clamping on the lower surface of the attachment interface.

* * * * *

UNITED STATES PATENT AND TRADEMARK OFFICE
CERTIFICATE OF CORRECTION

PATENT NO.        : 8,668,181 B2                                                         Page 1 of 1
APPLICATION NO. : 12/811387
DATED             : March 11, 2014
INVENTOR(S)       : Dazet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 374 days.

Signed and Sealed this

Twenty-ninth Day of September, 2015

Michelle K. Lee
*Director of the United States Patent and Trademark Office*